United States Patent [19]

Chattha

[11] 4,178,324
[45] Dec. 11, 1979

[54] HIGH SOLIDS COATING COMPOSITION WITH OLIGOMERIC HYDROXY PHOSPHATE CATALYST-B

[75] Inventor: Mohinder S. Chattha, Livonia, Mich.

[73] Assignee: Ford Motor Company, Dearborn, Mich.

[21] Appl. No.: 973,321

[22] Filed: Dec. 26, 1978

[51] Int. Cl.$^2$ ............................................. C08L 63/00
[52] U.S. Cl. ........................... 525/188; 260/32.8 EP; 260/32.8 N; 260/33.6 EP; 260/33.6 UA; 260/39 M; 260/39 R; 525/512
[58] Field of Search ........................................ 260/834

[56] References Cited

U.S. PATENT DOCUMENTS

| | | | |
|---|---|---|---|
| 2,528,359 | 10/1950 | Greenlee | 260/834 |
| 2,528,360 | 10/1950 | Greenlee | 260/834 |
| 2,541,027 | 2/1951 | Bradley | 260/18 EP |
| 2,732,367 | 1/1956 | Shokal | 260/834 |
| 2,849,418 | 8/1958 | Fang | 260/836 |
| 3,133,838 | 5/1964 | Higgins | 260/837 R |
| 3,198,850 | 8/1965 | Levantin | 260/834 |
| 3,260,622 | 7/1966 | Suer | 526/13 |
| 3,524,903 | 8/1970 | Hargis | 260/837 R |
| 3,651,169 | 3/1972 | Davis | 260/834 |
| 3,936,416 | 2/1976 | Brady | 260/42.18 |
| 3,960,979 | 6/1976 | Khanna | 260/834 |
| 4,018,848 | 4/1977 | Khanna | 260/834 |
| 4,027,066 | 5/1977 | Victorius | 260/834 |
| 4,055,607 | 10/1977 | Sullivan | 260/834 |

Primary Examiner—Paul Lieberman
Attorney, Agent, or Firm—Roger L. May; Keith L. Zerschling

[57] ABSTRACT

A fast curing, high solids coating composition which upon curing forms a hard, glossy, durable coating exhibiting excellent resistance to solvents and water. The coating composition which is particularly adapted for use as an automotive topcoat, contains greater than about 60 percent by weight of nonvolatile solids and, exclusive of pigments, solvents and other nonreactive components, consists essentially of:

(A) a bifunctional copolymer bearing hydroxy functionality and pendent epoxy functionality, having a number average molecular weight ($\overline{M}_n$) of between about 1500 and about 10,000 and a glass transition temperature (Tg) of between about $-25°$ C. and about 70°;

(B) a reactive catalyst comprising at least one oligomeric hydroxy functional organophosphate ester selected from certain mono- and diesters of phosphoric acid;

(C) an amine-aldehyde crosslinking agent; and (D) optionally, a hydroxy functional additive. The oligomeric hydroxy functional organophosphate ester is included in the composition in an amount sufficient to provide between about 0.8 and about 1.5 equivalents of acid functionality for each equivalent of pendent epoxy functionality in copolymer (A), and the amine aldehyde crosslinking agent is included in the composition in an amount sufficient to provide at least about 0.4 equivalents of nitrogen crosslinking functionality for each equivalent of hydroxy functionality included in the composition.

17 Claims, No Drawings

HIGH SOLIDS COATING COMPOSITION WITH OLIGOMERIC HYDROXY PHOSPHATE CATALYST-B

BACKGROUND OF THE INVENTION

This invention is related to a fast curing, high solids, thermosetting coating composition. More particularly, the invention relates to a polymeric, high solids, fast curing coating composition which is particularly adapted to provide an automotive topcoat and which demonstrates hardness, high gloss, outstanding durability and excellent resistance to solvents and water. Still more particularly, this invention relates to a fast curing, high solids, thermosetting coating composition adapted to be used as an automotive topcoat wherein the topcoat includes metallic flake as a pigment.

Because of increasingly strict solvent emissions regulations in recent years, low solvent emission paints have become very desirable. A number of high solids paint compositions have been proposed to meet these low solvent emission requirements. However, many of these compositions are deficient because of difficulty in application, slow curing rates, lack of flexibility, poor durability and low solvent and water resistance. Many of the proposed compositions have been particularly deficient as automotive topcoats, particularly when the topcoat is to include metallic flake as a pigment.

The deficiency in compositions including metallic flake results from undesired reorientation of the metallic flake during application and cure of the coating. Flake reorientation results primarily because of the very low viscosity resins used in the paint compositions to accommodate high solids. The low viscosity is not sufficient to immobilize the flakes which tend to redistribute themselves to show "reverse flop" and nonuniform distribution.

The coating compositions of this invention combine the above discussed desired properties and low application viscosity with rapid cure so as to overcome deficiencies of previously proposed high solids materials and thereby achieve a high solids coating composition particularly adapted for automotive topcoats including metallic flake as a pigment.

SUMMARY OF THE INVENTION

The thermosetting coating composition of this invention contains greater than about 60 percent by weight of nonvolatile solids, preferably greater than about 70 percent by weight, and is capable of curing rapidly at a low temperature. The composition, exclusive of pigments, solvents and other nonreactive components, consists essentially of:

(A) a bifunctional copolymer bearing hydroxy functionality and pendent epoxy functionality, having a number average molecular weight ($\overline{M}_n$) of between about 1500 and about 10,000 and a glass transition temperature (Tg) of between about $-25°$ and about 70° C., the copolymer consisting of (i) between about 5 and about 25 weight percent of monoethylenically unsaturated monomers bearing glycidyl functionality and between about 5 and about 25 weight percent of monoethylenically unsaturated monomers bearing hydroxy functionality, with the total of the monoethylenically unsaturated monomers bearing either said glycidyl functionality or said hydroxy functionality being not greater than about 30 weight percent of the monomers in the bifunctional copolymer, and (ii) between about 90 and about 70 weight percent of other monoethylenically unsaturated monomers;

(B) a reactive catalyst comprising at least one oligomeric hydroxy functional organophosphate ester having the formula:

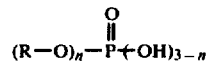

wherein n=1 to 2 and R is selected from the group consisting of mono- or dihydroxy radicals containing one or more ester linkages and having a molecular weight of between about 120 and about 1500;

(C) an amine aldehyde crosslinking agent; and (D) up to about 45 weight percent based on the total weight of (A), (B), (C) and (D) of a hydroxy functional additive having a number average molecular weight ($\overline{M}_n$) of between about 150 and about 6,000.

The organophosphate ester is included in the composition in an amount sufficient to provide between about 0.8 and about 1.5 equivalents, preferably between about 0.9 and about 1.2 equivalents, of acid functionality for each equivalent of pendent epoxy functionality on the bifunctional copolymer. The amino crosslinking agent is included in the composition in an amount sufficient to provide at least about 0.4 equivalents, preferably between about 0.6 and about 2.1 equivalents, of nitrogen crosslinking functionality for each equivalent of hydroxy functionality included in the composition either as (i) an organic hydroxyl group on said oligomeric hydroxy functional organophosphate ester, (ii) a hydroxyl group on said bifunctional copolymer, (iii) a hydroxyl group on said hydroxy functional resin, or (iv) as a result of esterification of the pendent epoxy functionality of said bifunctional copolymer during cure of the composition. In addition, the high solids coating composition of the invention may include additives such as catalysts, antioxidants, U.V. absorbers, flow control or wetting agents, antistatic agents, pigments, plasticizers, solvents, etc.

PRIOR ART

U.S. Pat. Nos. 3,960,979 and 4,018,848 to Khanna teach high solids coating compositions adapted for use as a can coating material. The compositions consist essentially of (i) aromatic epoxide compositions having two or more epoxy groups on an epoxy resin which has a molecular weight not exceeding 2500; (ii) an amino crosslinking agent; (iii) an inorganic or organic monomeric or polymeric acid which acts as a reactive catalyst; and (iv) a flexiblizing polyol.

The compositions of Khanna have the advantage of quick reaction and low application viscosity, but lack durability, and, therefore, do not weather well. This is, in part, because of the presence of ether linkages in the aromatic epoxides. As such, the compositions of Khanna are not desirable for use as automotive topcoats. The Khanna patents describe the compositions as a low cure system. However, when considering the specific teachings of the patents one finds that the composition includes an excess of epoxide resin, apparently with the purpose of "killing off" excess catalyst after completion of the curing reaction. Excess epoxy resin in the composition remains uncured at the low temperature bake range of the baking temperatures disclosed, not giving a complete cure and desirable hardness, durability or solvent resistance. If heated to higher temperatures, as called for in the examples, the excess epoxy does react with excess hydroxy functionality to give still further ether linkages. These ether linkages so obtained have a further deleterious effect on durability and make the materials particularly unsuitable for use as an automotive topcoat. Also, the necessary high bake temperatures to achieve the utilization of this excess epoxy makes the composition undesirable from an energy point of view because of the high baking temperatures required. Still further, because the epoxy/catalyst reaction occurs in early stages of the cure, thus "killing off" the catalyst, the melamine-hydroxy curing reaction must proceed substantially without benefit of catalysis. The curing reaction thus proceeds slowly and requires the higher temperatures of the Khanna examples.

DETAILED DESCRIPTION OF THE INVENTION

The high solids coating compositions of this invention overcome disadvantages of prior art high solids compositions, including those of Khanna, to provide a system which is particularly suitable for those applications requiring high gloss, hardness, durability, and high solvent and water resistance as well as a fast cure rate at low temperatures, e.g., between about 75° C. and about 150° C., preferably between about 110° C. and about 130° C. The desirable characteristics of the coating compositions of this invention result from the carefully controlled admixture of the particular components, including an oligomeric hydroxy functional organophosphate ester, to achieve substantially complete utilization of reactant functionality and a resultant highly crosslinked coating in a fast and efficient manner.

Each of the components of the high solids coating compositions, the amounts of each of the components required to achieve the desired results of the invention and a method for applying the composition are described hereinafter in greater detail.

Bifunctional Copolymer

A principal material in the high solids coating compositions of this invention is a bifunctional copolymer bearing both hydroxy functionality and pendent epoxy functionality and which may be prepared by conventional free radical induced polymerization of suitable unsaturated monomers. The term "copolymer" as used herein means a copolymer of two or more different monomers.

The copolymers used in the high solids coating compositions of this invention have a number average molecular weight ($\overline{M}_n$) of between about 1500 and about 10,000, preferably between about 2,000 and about 6,000, and a glass transition temperature (Tg) of between about −25° C. and about 70° C., preferably between about −10° C. and about 50° C. The monomers used to prepare the copolymer include between about 5 and about 25 weight percent of one or more monoethylenically unsaturated monomers bearing glycidyl functionality and between about 5 and about 25 weight percent of one or more monoethylenically unsaturated monomers bearing hydroxy functionality, with the total of the monoethylenically unsaturated monomers bearing either epoxy or hydroxy functionality being not greater than about 30 weight percent of the monomers in the copolymer. The monoethylenically unsaturated monomers bearing glycidyl functionality may be either glycidyl ethers or glycidyl esters. Preferably, however, the epoxy functional monomers are glycidyl esters of monoethylenically unsaturated carboxylic acids. Examples are glycidyl acrylates and glycidyl methacrylates. These monomers provide the bifunctional copolymer with the pendent epoxy functionality.

The monoethylenically unsaturated hydroxy functional monomers useful in preparation of the copolymer and providing the hydroxy functionality to the bifunctional copolymer may be selected from a long list of hydroxy functional monomers. Preferably, however, the hydroxy functional monomers are acrylates and may be selected from the group consisting of, but not limited to, the following esters of acrylic or methacrylic acids and aliphatic alcohols:

2-hydroxyethyl acrylate; 3-chloro-2-hydroxypropyl acrylate;
2-hydroxy-1-methylethyl acrylate; 2-hydroxypropyl acrylate;
3-hydroxypropyl acrylate; 2,3 dihydroxypropyl acrylate;
2-hydroxy-butyl acrylate; 4-hydroxybutyl acrylate; diethylene-glycol acrylate; 5-hydroxypentyl acrylate; 6-hydroxyhexyl acrylate; triethyleneglycol acrylate; 7-hydroxyheptyl acrylate; 2-hydroxymethyl methacrylate;
3-chloro-2-hydroxypropyl methacrylate; 2-hydroxy-1-methylethyl methacrylate; 2-hydroxypropyl methacrylate;
3-hydroxypropyl methacrylate; 2,3 dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxyl bearing monomers, including those listed, above could be employed, the preferred hydroxy functional monomers for use in the bifunctional copolymer of the invention are $C_5$–$C_7$ hydroxy alkyl acrylates and/or $C_5$–$C_7$ hydroxy alkyl methacrylates; i.e., esters of $C_2$–$C_3$ dihydric alcohols and acrylic or methacrylate acids.

The remainder of the monomers forming the bifunctional copolymer, i.e., between about 90 and about 70 weight percent of the monomers of the copolymer, are other monoethylenically unsaturated monomers. These monoethylenically unsaturated monomers are preferably alpha beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are acrylates (meaning esters of either acrylic or methacrylic acids) as well as mixtures of acrylates and vinyl hydrocarbons. Preferably, in excess of 50 weight percent of the total of the copolymer monomers are esters of $C_1$–$C_{12}$ monohydric alcohols and acrylic or methacrylic acids, e.g., methylmethacrylate, ethylacrylate, butylacrylate, butylmethacrylate, hexylacrylate, 2-ethylhexylacrylate, laurylmethacrylate, etc. Among the monovinyl hydrocarbons suitable for use in forming the copolymers are those containing 8 to 12 carbon atoms and including styrene, alpha methylstyrene, vinyl toluene, t-butylstyrene and chlorostyrene. When such monovinyl hydrocarbons are employed, they should constitute less than 50 weight percent of the copolymer. Other monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer.

In preparing the bifunctional copolymer, the epoxy functional monomers, the hydroxy functional monomers and the remaining monoethylenically unsaturated monomers are mixed and reacted by conventional free radical initiated polymerization in such proportions as to obtain the copolymer desired. A large number of free radical initiators are known to the art and are suitable for the purpose. These include: benzooyl peroxide; lauryl peroxide; t-butylhydroxy peroxide; acetylcyclohexylsulfonyl peroxide; diisobutyryl peroxide; di-(2-ethylhexyl) peroxydicarbonate; diisopropylperoxydicarbonate; t-butylperoxypivalate; decanoyl peroxide; azobis (2-methylpropionitrile), etc. The polymerization is preferably carried out in solution using a solvent in which the bifunctional copolymer is soluble. Included among the suitable solvents are toluene, xylene, dioxane, butanone, etc. If the bifunctional copolymer is prepared in solution, the solid copolymer can be precipitated by pouring the solution at a slow rate into a nonsolvent for the copolymer, such as hexane, octane, or water, under suitable agitation conditions.

The bifunctional copolymer useful in the compositions of this invention can also be prepared by emulsion polymerization, suspension polymerization, bulk polymerization, or combinations thereof, or still other suitable methods. In these methods of preparing copolymers, chain transfer agents may be required to control molecular weight of the copolymer to a desired range. When chain transfer agents are used, care must be taken so they do not decrease the shelf stability of the composition by causing premature chemical reactions.

Organophosphate Ester

A second essential component of the high solids coatings of this invention is a reactive catalyst which comprises a novel oligomeric hydroxy functional organophosphate ester which is present in the composition as a mono- or diester or as a mixture of such mono- and diesters. The oligomeric hydroxy functional organophosphate esters useful in the compositions of the invention are those having the formula:

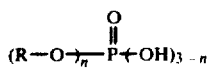

wherein n=1 to 2 and R is selected from the group consisting of mono- or dihydroxy radicals containing one or more ester linkages and having a molecular weight of between about 120 and about 1500.

A preferred method for preparing the oligomeric hydroxy functional organophosphate esters useful in compositions of the invention is by an esterification reaction between an excess of a di- or trihydroxy alkyl, cycloalkyl or aryl oligoester and phosphorus pentoxide. When a trihydroxy oligoester is used as a reactant, preferably at least one of the hydroxyl groups should be secondary. The reaction between the di- or trihydroxy oligoester and the phosphorus pentoxide is generally carried out by adding phosphorus pentoxide portionwise to an excess of the di- or trihydroxy oligoester in a liquid state or in solution in a suitable solvent. Suitable solvents include, but are not limited to, butyl acetate, methyl ethyl ketone, toluene, xylene, etc.

The hydroxy functional oligoesters useful in preparing the oligomeric hydroxy functional organophosphate esters used in the compositions of the invention have a molecular weight of between about 120 and about 1500. Such oligoesters may be prepared in accordance with numerous procedures recognized in the art. For example, the hydroxy functional oligoesters may be selected from the group consisting of: (i) dihydroxy oligoesters prepared by reacting a dicarboxylic acid with a monoepoxide, (ii) trihydroxy oligoesters prepared by reacting a monohydroxy dicarboxylic acid with a monoepoxide; (iii) dihydroxy oligoesters prepared by reacting a monocarboxylic acid with a diepoxide; (iv) trihydroxy oligoesters prepared by reacting a monocarboxylic acid with a monohydroxy diepoxide; (v) dihydroxy oligoesters prepared by reacting a monohydroxy monocarboxylic acid with a monoepoxide; (vi) trihydroxy oligoesters prepared by reacting a monohydroxycarboxylic acid with a monohydroxy monoepoxide; (viii) trihydroxy oligoesters prepared by reacting a monocarboxylic acid with a dihydroxy monoepoxide; (ix) dihydroxy oligoesters prepared by reacting a monocarboxylic acid with a monohydroxy monoepoxide; and (x) di- or trihydroxy oligoesters prepared by reacting polycaprolactones with diols or triols.

Dihydroxyoligoesters prepared by reacting a dicarboxylic acid with a monoepoxide and designated by (i) above are well known in the art. The most common of this group is a low molecular weight adduct of an aliphatic, cycloaliphatic or aryl dicarboxylic acid and a monoepoxide. Most commonly used monoepoxides are alkylene oxides such as ethylene oxide or propylene oxide. Among the numerous dicarboxylic acids which may be used are malonic acid, succinic acid, glutaric acid, 1,9 nonanedioic acid, 1,4-cyclohexanedicarboxylic acid, terephthalic acid, etc. Preferred dicarboxylic acids are $C_6$–$C_{12}$ aliphatic acids as well as mixtures of these acids or mixtures of the aliphatic dicarboxylic acids with cycloaliphatic or aromatic dicarboxylic acids. The above described adducts, which arte prepared by reacting the acid and epoxide in the presence of a catalyst, have a narrow molecular weight distribution when compared to similar compositions made by normal polyester manufacturing techniques. While the specific reactants enumerated above will result in compounds containing two (2) ester groups, it will be appreciated that additional ester linkages may be present in the compound as a result of being included as a part of a radical born by either the monoepoxide or the dicarboxylic acid. For example, an oligoester bearing more than two ester linkages may be prepared by reacting dicarboxylic acid with glycidyl carboxylate. This reaction results in a dihydroxy oligoester bearing four (4) ester linkages. Of course, various other combinations of dibasic acids and monoepoxides will be apparent to the skilled artisan.

In preparing the trihydroxy oligoesters designated as (ii) above, numerous monohydroxy dicarboxylic acids may be employed in lieu of the dicarboxylic acids previously described. Representative of these monohydroxy aliphatic, cycloaliphatic or aromatic dicarboxylic acids are malic acid, hydroxyglutaric acid, 2-hydroxy-1,4-cyclohexanedicarboxylic acid and 2-methylol terephthalic acid. As with oligoesters designated by (i) above, the preferred monohydroxydicarboxylic acids are $C_6$-$C_{12}$ aliphatic acids, mixtures of those acids or mixtures of those acids with cycloaliphatic or aromatic dicarboxylic acids.

In preparing dihydroxy oligoesters designated as (iii) above, a monocarboxylic acid is reacted with a diepoxide. Representative of the numerous aliphatic, cycloaliphatic or aromatic monocarboxylic acids which may be used are pentanoic acid, hexanoic acid, heptanoic acid, cyclohexane carboxylic acid and benzoic acid. Preferred monocarboxylic acids are acetic acid, propionic acid and butyric acid. Among the numerous suitable diepoxides which will be apparent to those skilled in the art are: cycloaliphatic diepoxides and glycidyl ethers of aliphatic and aromatic dihydroxy compounds. As was the case above, polyester linkages other than those resulting from the esterification reaction between the acid and epoxy groups may be included by using acids or diepoxides containing a radical bearing one or more ester linkages. For example, acetic acid could be reacted with bis-(3,4-epoxy-6-methylcyclohexyl methyladipate to yield an oligoester with four (4) ester linkages.

Trihydroxy oligoesters designated (iv) may be prepared by reacting monocarboxylic acids such as described in (iii) with monohydroxy diepoxides. Typical monohydroxy diepoxides are: hydroxyglycidyl ethers of bisphenol A and aliphatic hydroxyglycidyl resins. As above, radicals bearing additional ester linkages may be included in the acid or diepoxide.

Dihydroxy oligoesters designated as (v) above may be prepared by reacting a monohydroxy monocarboxylic acid with a monoepoxide. Representative of the numerous aliphatic, cycloaliphatic or aromatic monohydroxy monocarboxylic acids are 3-hydroxybutyric acid, 4-hydroxycyclohexylcarboxylic acid and 4-methylol benzoic acid.

Suitable monoepoxides are enumerated above in the discussion of oligoesters (i) and (ii). As in all cases, radicals bearing additional ester linkages may be included.

The trihydroxy oligoester of (vi) is a variation of (v) with the reactants being a monoepoxide as above and a dihydroxymonocarboxylic acid such as 3,4-dihydroxybutyric acid and glyciric acid.

The trihydroxy oligoester of (vii) is prepared by reacting a monohydroxy monocarboxylic acid such as in (v) above with a monohydroxy monoepoxide such as, for example, glycidol and 1,4-butanediolmonoglycidyl ether. As in other cases, additional ester linkages may also be included in the oligoester.

The trihydroxy oligoester designated (viii) may be prepared by reacting a monocarboxylic acid as above with a dihydroxy monoepoxide such as acetic acid with 2,3 epoxy-1,4-butane diol. Additional ester linkages may be included, if desired.

The dihydroxy oligoester (ix) is prepared by reacting a monocarboxylic acid with a monohydroxy monoepoxide. Both reactants are discussed above and, as in other cases, additional ester linkages may be added using ester bearing radicals.

Hydroxy functional oligoesters of the type designated by (x) above are known in the art. Polycaprolactones, such as caprolactone, reacted with diols yield dihydroxy oligoesters while reaction with triols yields trihydroxy oligoesters.

A preferred temperature for carrying out the reaction between the hydroxy functional oligoester and the phosphorus pentoxide is between about 50° C. and about 55° C. Due to the multiple hydroxy functionality of the dior- or trihydroxy oligoester, minor amounts of polymeric acid phosphate as well as certain cyclophosphates are also generated during the synthesis. These polymeric and cyclic materials also serve as a reactive catalyst and, therefore, need not be separated from the hydroxyphosphate esters described above. In fact, it has been found advantageous in preferred embodiments of the invention to employ all reaction products, i.e., the oligomeric hydroxy functional organophosphate esters and the minor amount of polymeric acid phosphate cyclophosphates, as well as excess di- or trihydroxy oligoester in the coating compositions. The excess di- or trihydroxy oligoester serves in those compositions as the optional hydroxy functional additive. Reactive catalysts prepared by the above preferred method will generally include about a 1 to 1 ratio of the mono- and diester organophosphate.

The oligomeric hydroxy functional organophosphate ester component of the high solids coating composition of the invention is a reactive catalyst which allows the composition to cure rapidly at a low temperature. The acid functionality of the mono- or diester or mixture of such esters reacts with the pendent epoxy functionality of the bifunctional copolymer to form an ester and a hydroxyl group. This hydroxyl group, as well as the organic hydroxyl groups on the oligomeric hydroxy functional organophosphate ester, the additional hydroxy functionality on the bifunctional copolymer and any optional hydroxy groups included in the composition in the form of hydroxy functional additive, including excess di- or trihydroxy oligoester present from the synthesis of the oligomeric hydroxy functional organophosphate ester, crosslinks with the amino resin crosslinking agent. It is critical to achieving the most preferred results of the high solids coating compositions of this invention, i.e., in making them suitable for use as automotive topcoats, that the amount of the oligomeric hydroxy functional organophosphate ester be sufficient to convert substantially all of the epoxy functionality on the bifunctional copolymer to the desired hydroxy functionality by esterification reaction. Therefore, the organophosphate ester is included in the composition in an amount sufficient to provide between about 0.8 and about 1.5 equivalents, preferably between about 0.9 and about 1.2 equivalents, of acid functionality for each equivalent of pendent epoxy functionality on the bifunctional copolymer. As will be noted from the equivalent amounts of epoxy and organophosphate acid ester functionality stated above, the acid functionality need not be in stoichiometric amounts to the epoxy functionality. This is because of the fact that during curing of the high solids coating composition, residual water present in the composition hydrolyzes some of the esterified product back to acid and this esterified product then, in turn, reacts with additional epoxy functionality.

Amino Crosslinking Agent

A third essential component of the high solids paint compositions of this invention is an amino resin crosslinking agent. Amino crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amino crosslinking agents useful in this invention are amine-aldehyde resins such as condensation products of formaldehyde with melamine, substituted melamine, urea, benzoguanamine or substituted benzoguanamine. Preferred members of this class are methylated melamine-formaldehyde resins such as hexamethoxymethylmelamine. These liquid crosslinking agents have substantially 100 percent nonvolatile content as measured by the foil method at 45° C. for 45 minutes. For the purposes of the invention it should be recognized that it is important not to introduce extraneous diluents that would lower the final solids content of the coating.

Particularly preferred crosslinking agents are those sold by American Cyanamid under the trademark "Cymel". In particular, Cymel 301, Cymel 303 and Cymel 1156, which are alkylated melamine-formaldehyde resins, are useful in the compositions of the invention by reacting with hydroxy functionality included in the composition (i) as an organic hydroxyl group on the oligomeric hydroxy functional organophosphate ester, (ii) as hydroxy functionality on the bifunctional copolymer, (iii) as hydroxy functionality on the optional hydroxy functional additive, or (iv) as a result of esterification of the pendent epoxy functionality on the bifunctional copolymer.

In order to achieve the outstanding properties which make these coating compositions particularly useful as automoive topcoat materials, it is essential that the amount of amino crosslinking agent be sufficient to substantially completely crosslink the hydroxy functionality in the coating composition. Therefore, the amino resin crosslinking agent should be included in the composition in an amount sufficient to provide at least about 0.4 equivalents, preferably between about 0.6 and about 2.1 equivalents, of nitrogen crosslinking functionality for each equivalent of hydroxy functionality included in the composition.

Optional Hydroxy Functional Additive

Additional hydroxy functionality other than that achieved by esterification of pendent epoxy functionality of the bifunctional copolymer or by the oligomeric hydroxy functional organophosphate ester may be achieved by adding a hydroxy functional additive in amounts up to about 45 weight percent based on the total of the three above discussed components and the hydroxy functional additive itself. Such a material serves to provide additional hydroxy functionality so as to provide a more intimate crosslinked structure in the final cured product. The hydroxy functional additives useful in the composition are preferably selected from various polyols have a number average molecular weight ($\bar{M}_n$) of between about 150 and about 6,000, preferably between about 400 and about 2500. As used herein the term polyol means a compound having two or more hydroxyl groups.

The polyols useful for the invention preferably are selected from the group consisting of: (i) hydroxy functional polyesters; (ii) hydroxy functional polyethers; (iii) hydroxy functional oligoesters, (iv) monomeric polyols; (v) hydroxy functional copolymers produced by free radical polymerization of monoethylenically unsaturated monomers, one or more of which bears hydroxy functionality and which is included in the copolymer in an amount ranging from about 2.5 to about 30 weight percent of the copolymer; and (vi) mixtures of (i)–(v).

The hydroxy functional polyesters useful in the invention are preferably fully saturated products prepared from aliphatic dibasic acids containing 2–20 carbon atoms, such as succinic acid, glutaric acid, adipic acid, azelaic acid, etc., and short chain glycols of up to and including 21 carbon atoms, such as ethylene glycol, 1,2-propylene glycol, 1,3-propylene glycol, 1,2-butylene glycol, 1,3-butylene glycol, 1,4-butylene glycol, neopentyl glycol, 1,4-cyclohexane dimethylol, 1,6-hexamethylene glycol and 2-ethyl-2-methyl-1,3 propane diol. The molecular weight of these materials ranges from about 150 to about 3000 and the hydroxyl number ranges from about 30 to about 230. The hydroxyl number is defined as the number of milligrams of potassium hydroxide needed for each gram of sample to neutralize the acetic acid generated during the reaction between the polyol and excess acetic anhydride. The polyester polyols utilized in the invention are low melting, soft waxy solids which are easily maintained in the molten state.

Among preferred polyesters are products derived from the esterification of ethylene glycol and 1,4 butane diol with adipic acid, ethylene glycol and 1,2 propylene glycol with adipic acid, azelaic acid and sebacic acid copolyester diols, and mixtures thereof.

Among useful polyether diols are polytetramethylene ether glycol, polyethylene glycol, polypropylene glycol and the like.

The hydroxy functional oligoesters useful as hydroxy functional additives in the compositions of the invention are oligoesters preferably having a molecular weight of between about 150 and about 3000. Included in this class of materials are the di- or trihydroxy oligoesters described above for use in preparing the oligomeric hydroxy phosphate ester catalysts of the invention. Similar oligoester with molecular weights greater than the 1500 limit of those oligoesters up to the 3000 limit specified above as well as similarly prepared oligoesters bearing more than three hydroxyl groups may be employed.

Among the numerous monomeric polyols which may be employed as the hydroxy functional additive are the various short chain glycols of up to and including 21 carbon atoms which are useful in preparing the hydroxy functional polyesters discussed above. Other conventional polyhydric alcohols such as glycerols and sugar alcohols are also among the numerous monomeric polyols which will be apparent to those skilled in the art. Triols which may be used in the synthesis of the hydroxy functional organophosphate ester may be employed as all or part of the monomeric polyol in the composition of the invention.

The hydroxyl bearing copolymer useful as the hydroxy functional additive may be formed from monoethylenically unsaturated monomers, with between about 2.5 and 30 weight percent bearing hydroxy functionality.

The suitable hydroxy functional monomers for preparation of the hydroxy functional resins useful in the invention are the same as those useful in preparation of the bifunctional copolymer discussed above.

The remainder of the monomers forming the hydroxy functional copolymer, i.e., between about 90 and about 70 weight percent, are other monoethylenically unsaturated monomers. These monoethylenically unsaturated monomers, as was the case with respect to the bifunctional copolymer discussed above, are preferably alpha-beta olefinically unsaturated monomers. As was also the case with respect to the bifunctional copolymer, the preferred alpha-beta olefinically unsaturated monomers are acrylates and preferably are employed in excess of 50 weight percent of the total copolymer. Preferred acrylate monomers are esters of $C_1$–$C_{12}$ monohydric alcohols and acrylic or methacrylic acids. Monovinyl hydrocarbons and other modifying monomers may also be employed in the same proportion as they are employed in the bifunctional copolymer discussed above.

Other Materials

In addition to the above discussed components, other materials may be included in the high solids coating compositions of the invention. These include materials such as catalysts, antioxidants, U.V. absorbers, solvents, surface modifiers and wetting agents as well as pigments. The solvents used in the coating compositions of the invention are those which are commonly used. Typical solvents useful in the coating compositions facilitate spray application at high solids content and include toluene, xylene, methyethyl ketone, acetone, 2-ethoxy-1-ethanol, 2-butoxy-1-ethanol, diacetone alcohol, tetrahydrofuran, ethylacetate, dimethylsuccinate, dimethylglutarate, dimethyladipate or mixtures thereof. The solvent in which the bifunctional copolymer of the coating composition is prepared, may be employed as the solvent for the coating composition, thus eliminating the need for drying the bifunctional copolymer after preparation if such is desired. As mentioned above, the nonvolatile solids content of the high solids coating composition is at least 60 percent and preferably 70 percent or more, thus limiting the amount of solvent included in the composition.

Surface modifiers or wetting agents are common additives for liquid paint compositions. The exact mode of operation of these surface modifiers is not known, but it is thought that their presence contributes to better adhesion of the coating composition to the surface being coated and helps formation of thin coatings on surfaces, particularly metal surfaces. These surface modifiers are exemplified by acrylic polymers containing 0.1–10 percent by weight of a copolymerized monoethylenically unsaturated carboxylic acids such as methacrylic acid, acrylic acid or itaconic acid, cellulose acetate butyrate, silicon oils or mixtures thereof. Of course, the choice of surface modifier or wetting agent is dependent upon the type of surface to be coated and selection of the same is clearly within the skill of the artisan.

The high solids coating composition of the invention also may include pigments. As noted above, the high solids composition of this invention are particularly useful when the coating composition includes metallic flake as a pigment. The rapid set and curing of the composition eliminates problems associated with redistribution of the metallic flake in the composition. The amount of pigment in the high solids coating composition may vary, but preferably is between about 3 and about 45 weight percent based on the total weight of the paint composition. If the pigment is metallic flake, the amount ranges from about 1 to about 7 weight percent.

Application Techniques

The high solids coating composition can be applied by conventional methods known to those in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

(a) 941 grams of azelaic acid are heated to melt in a three-necked flask equipped with a stirring rod, dropping funnel and a condenser. Sixteen grams of Cordova Accelerator (AMC-2) are added to the above melt and 725 grams of propylene oxide are added dropwise with continuous stirring; ice-cold water is continuously circulated through the condenser. After the addition is complete, the reaction mixture is heated for half an hour and then a slight vacuum is applied to remove any excess propylene oxide.

Five hundred (500) grams of the above ester, bis(hydroxypropyl) azelate, are placed under nitrogen in a three-necked flask and powdered phosphorus pentoxide is added with continuous stirring. An exothermic reaction occurs; the addition of $P_2O_5$ is regulated to maintain the temperature at 50°–55° C. The addition of $P_2O_5$ is continued until the acid equivalent weight of the reaction mixture has reached 430. The reaction mixture is allowed to stay overnight and then titrated with KOH solution to obtain an acid equivalent weight of 398.

(b) In a three-necked, round bottom, two liter flask, equipped with a stirrer, a condenser and a dropping funnel, 750 ml of toluene is brought to reflux under nitrogen. The following mixture of monomers, containing 15 grams of 2,2'-azobis-(2-methyl propionitrile) dissolved in 50 ml acetone, is added dropwise to the refluxing toluene.

|  | Weight Gram | Weight Percent |
| --- | --- | --- |
| Butyl methacrylate | 150 | 50 |
| Glycidyl methacrylate | 45 | 15 |
| Hydroxypropyl methacrylate | 30 | 10 |
| Methyl methacrylate | 60 | 20 |
| Styrene | 15 | 5 |

The addition of the initiator and monomer solution is completed in three hours. The reaction mixture is refluxed for half an hour more and 10 ml of an acetone solution of 2 grams of the above initiator is added dropwise and the reaction mixture refluxed for half an hour. Part of the solvent is distilled out to bring the solids content to 66% by weight.

Twenty (20) parts of (b) are mixed with 9 parts of Cymel 301 and the mixture dissolved in ten (10) parts of butyl acetate. 6.6 parts of hydroxy phosphate (a) is added to the above solution and the resulting formulation drawn on a steel test panel. The panel is baked at 125° C. for 20 minutes to obtain a coating with excellent hardness, adhesion and solvent (xylene and methyl ethyl ketone) resistance.

EXAMPLE 2

Twenty-five (25) parts of the copolymer solution described in Example 1(b), sixteen (16) parts of Cymel 301 and twelve (12) parts of polyester Desmophen KL5-2330 (Mobay Chemical Company) are dissolved in 12 parts of butyl acetate. Hydroxy phosphate reaction from Example 1(a), 8.5 parts, is added to the above solution and the resulting formulation spray applied to primed test panels. The panels are baked at 130° C. for 20 minutes to obtain a coating with excellent hardness, adhesion and solvent (xylene and methyl ethyl ketone) resistance.

EXAMPLE 3

(a) 524 grams of bis-(hydroxypropyl) adipate are prepared from adipic acid and propylene oxide by following the method described for bis-(hydroxypropyl) azelate in Example 1(a). By following the procedure described in Example 1(a), oligomeric hydroxyphosphate with an acid equivalent weight of 315 is prepared from this dihydroxy ester.

(b) A copolymer is prepared by following the procedure described in Example 1(a) in methyl amyl ketone at 125° C. and by using the following monomers:

|  | Weight Percent |
| --- | --- |
| Butyl methacrylate | 50 |
| Ethylhexyl acrylate | 10 |
| Glycidyl methacrylate | 15 |
| Hydroxypropyl methacrylate | 10 |
| Methyl methacrylate | 10 |
| Styrene | 5 |

Tert-butyl peroctoate (5.25% of monomers) is used as an initiator and the determined solids content is 56.6% by weight. The calculated Tg of the copolymer is 25° C. and the molecular weight from Gel Permeation Chromatography is found to be $\overline{M_n}=4220$ and $\overline{M_w}/\overline{M_n}=1.90$.

A millbase is prepared by dispensing titanium dioxide in polymer solution a high speed Cowl's blade. The composition of the millbase is: 15% polymer (100% nonvolatile), 65% titanium dioxide and 20% methyl amyl ketone. Seventy-two (72) parts of this millbase, 31 parts of the polymer, 5 parts of bis-(hydroxypropyl) azelate, 29 parts of Cymel 301 and 21 parts of methyl amyl ketone are taken up in a plastic bottle. 9.5 parts of hydroxy phosphate reaction product (a) (equivalent weight 315), are added to the above mixture and the resulting formulation spray applied to both primed and unprimed steel panels. The panels are baked at 130° C. for 20 minutes to obtain hard, glossy coatings with excellent adhesion. The coating has excellent solvent and humidity resistance.

EXAMPLE 4

By following the procedure described in Example 3(b), a copolymer is prepared from the following monomers:

|  | Weight Percent |
| --- | --- |
| Butyl methacrylate | 60 |
| Glycidyl methacrylate | 20 |
| Hydroxyethyl acrylate | 10 |
| Styrene | 10 |

The calculated Tg of the polymer is 25° C. and solids content is found to be 54.9% by weight. The molecular weight by Gel Permeation Chromotography is found to be $\overline{M_n}=1809$ and $\overline{M_w}/\overline{M_n}=2.44$. In the manner described in Example 3, a millbase is prepared from the following materials:

| Copolymer | 21% | (100% nonvolatile) |
| --- | --- | --- |
| Titanium dioxide | 61% | |
| Methyl amyl ketone | 18% | |

Sixty-five (65) parts of this millbase, 27 parts of the above polymer, 5 parts bis-(hydroxyl propyl) azelate, 25 parts Cymel 301 and 20 parts of methyl amyl ketone are taken up in a plastic bottle. Hydroxy phosphate reaction product from Example 1(a) (equivalent weight 398), 17.9 parts, is added to the above mixture and the resulting formulation spray applied to both primed and unprimed panels. The panels are baked at 130° C. for 20 minutes to obtain hard coatings with excellent adhesion and solvent resistance.

EXAMPLE 5

By following the procedure described in Example 3(b), a copolymer is prepared from the following monomers.

|  | Weight Percent |
| --- | --- |
| Butyl methacrylate | 49 |
| Glycidyl methacrylate | 20 |
| Hydroxypropyl methacrylate | 10 |
| Methyl methacrylate | 16 |
| Styrene | 5 |

The calculated Tg of the copolymer is 43° C. and solids content is found to be 52%. The molecular weight, by Gel Permeation Chromatography, is found to be, $\overline{M_n}=2904$ and M $\overline{M_w}/\overline{M_n}=2.31$.

One hundred (100) parts of the above polymer solution are mixed with 5.5 parts of aluminum flakes (65% in naphtha), 31 parts of Cymel 301 and 10 parts of butyl acetate. Thirty (30) parts of the hydroxyphosphate reaction product from Example 1(a) are added to the above mixture and the resulting formulation is applied by spraying in three coats to primed panels. The panels are baked at 120° C. to obtain a silver metallic coating with excellent hardness, adhesion and solvent (xylene and methyl ethyl ketone) resistance.

EXAMPLE 6

By following the procedure described in Example 1(b) a copolymer is prepared in refluxing methyl amyl ketone from the following monomers:

|  | Weight Percent |
| --- | --- |
| Glycidyl methacrylate | 20 |
| Hydroxyethyl acrylate | 10 |
| Butyl methacrylate | 60 |
| Styrene | 10 |

Two percent tert-butyl peroctoate is used as an initiator; the solids content is found to be 53.6%. From Gel Permeation Chromotography the molecular weight of the polymer is found to be: $\overline{M_n}=2746$ and $\overline{M_w}/\overline{M_n}=2.33$.

As described in Example 3, a millbase is prepared with the following ingredients:

| | Weight Percent |
|---|---|
| Titanium dioxide | 56 |
| The above Polymer | 26 (100% nonvolatile) |
| Methyl amyl ketone | 18 |

Seventy-one (71) parts of this millbase, 15 parts polymer, 7 parts bis(hydroxypropyl) azelate, 27 parts Cymel 301, 25 parts methyl amyl ketone and 16.4 parts hydroxy phosphate reaction product (equivalent weight 398) from Example 1(a) are mixed in a plastic container. This formulation is spray applied to primed test panels. The panels are baked at 130° C. for 20 minutes to obtain glossy, hard coatings with excellent solvent (xylene and methyl amyl ketone) resistance. The coatings do not show any loss of gloss, adhesion or solvent resistance upon exposure in a Cleveland Humidity Chamber for 14 days.

EXAMPLE 7

(a) By following the procedure described in Example 1 (a), 586 grams of a mixture of bis(hydroxypropyl) azelate and bis-(hydroxypropyl) terephthalate are prepared from 188 grams of azelaic acid and 166 grams of terephthalic acid. Hydroxyphosphate reaction product with an acid equivalent weight of 337 is prepared from the above ester mixture as described in Example 1(a).

(b) By following the procedure described in Example 1 (b), a copolymer is prepared in refluxing toluene from the following monomers:

| | Weight Percent |
|---|---|
| Butyl methacrylate | 50 |
| Ethylhexyl acrylate | 20 |
| Glycidyl methacrylate | 15 |
| Hydroxypropyl methacrylate | 10 |
| Styrene | 5 |

One thousand grams of the total monomers and 700 ml toluene and 50 grams tert-butyl peroctoate are used. The calculated Tg of this polymer is 6° C. and the solids content is found to be 59% by weight; a Gel Permeation Chromatogram shows its molecular weight to be: $\overline{Mn}=4337$ and $\overline{Mw}/\overline{Mn}=2.14$. Viscosity of this polymer solution is 1.33 Stokes.

Fifty parts of the copolymer prepared in (b), 21 parts of Cymel 301, and 10.55 parts of hydroxy phosphate prepared in (a) are dissolved in 12 parts of n-butyl acetate. This formulation is spray applied in three coats to primed steel panels which are baked at 130° C. for 20 minutes to obtain coatings with excellent physical properties.

EXAMPLE 8

Forty (40) parts of polymer solution from Example 1(b) are mixed with 17 parts of butoxymethyl melamine (Cymel 1170), 2 parts of polypropyleneglycol (Pluracol P710, BASF Wyandotte) and 20 parts of butyl acetate. 11.2 parts Hydroxy-phosphate from Example 7(a) is added to the above solution and the resulting formulation applied by spraying to primed steel test panels. The panels are baked at 130° C. for 20 minutes to obtain coatings with excellent hardness, adhesion and solvent (xylene and methyl ethyl ketone) resistance.

EXAMPLE 9

By following the procedure described in Example 1(a), 90 grams of 3-hydroxypropionic acid were reacted with 73 grams of propylene oxide. The excess propylene oxide was evaporated under reduced pressure and the resulting ester was treated with $P_2O_5$, as described in Example 1(a), to obtain hydroxyphosphate reaction product with acid equivalent weight of 311. Sixty parts of the polymer solution from Example 7, 27 parts of Cymel 301 and 11.6 parts of the above hydroxyphosphate reaction product are dissolved in 15 parts of n-butyl acetate. This formulation is spray applied in three coats to primed steel panels which are baked at 130° C. for 20 minutes to obtain coating with excellent physical properties.

EXAMPLE 10

In the formulation described in Example 2, 17 parts of ethoxymethoxy benzoguanamine (Cymel 1123) are employed as a crosslinking resin instead of Cymel 301. The resulting formulation is applied by spraying onto primed steel test panels. The panels are baked at 130° C. for 20 minutes to obtain coatings with excellent hardness, adhesion and solvent (xylene and methyl ethyl ketone) resistance.

EXAMPLE 11

In this formulation, components described in Example 3, are employed in exact quantities as described therein except that 39 parts of butoxymethyl glycoluril (Cymel 1170) are used as the crosslinking agent instead of Cymel 301. The formulation is applied by spraying to primed steel panels and baked at 130° C. for 20 minutes to obtain hard, glossy coatings with excellent adhesion and solvent (xylene and methyl ethyl ketone) resistance.

EXAMPLE 12

In the formulation described in Example 4, 35 parts of butoxymethylurea resin (Beetle 80, American Cyanamid) are substituted for Cymel 301, and the resulting formulation spray applied to primed steel panels. The panels are baked at 130° C. for 20 minutes to obtain hard, glossy coatings with excellent adhesion and solvent (xylene and methyl ethyl ketone) resistance.

EXAMPLE 13

Five hundred grams of caprolactone based oligo-diol (mol. wt. 530, PCP-0200, Union Carbide) was treated with $P_2O_5$ as described in Example 1(a) to obtain a hydroxyphosphate reaction product with acid equivalent weight of 762.

Seventy-five (75) parts of the polymer solution from Example 5 are mixed with 4 parts of aluminum flakes (65% in naphtha), 33 parts of Cymel 301 and 7 parts of butyl acetate. Forty-two (42) parts of the above hydroxyphosphate are added to this solution and the resulting formulation is spray applied in three coats to primed panels. The panels are baked at 130° C. for 20 minutes to obtain silver metallic coating with excellent hardness, adhesion and solvent (xylene and methyl ethyl ketone) resistance.

EXAMPLE 14

(a) Two grams of Cordova Accelerator (AMC-2) is mixed with 155 grams of vinylcyclohexene dioxide and this mixture is added dropwise to 120 grams of refluxing acetic acid. After the addition is complete, the reaction mixture is stirred at 100° C. for one hour and then is allowed to cool to room temperature. The resulting ester is treated with P₂O₅, as described in Example 1(a), to obtain a hydroxyphosphate reaction product with an acid equivalent weight of 336.

(b) A copolymer is prepared from the following monomers by following the procedure described in Example 1(b).

|  | Weight Percent |
|---|---|
| Butyl methacrylate | 50 |
| Ethylhexyl acrylate | 10 |
| Glycidyl methacrylate | 15 |
| Hydroxypropyl methacrylate | 10 |
| Methyl methacrylate | 10 |
| Styrene | 5 |

Toluene is used as solvent to obtain a 60% solution of the polymer; tert-butyl peroctoate (3.7% of monomers) is used as an initiator. Toluene (60%) is distilled off and butyl acetate is added to bring the solids level to 60% by weight. The calculated Tg of the polymer is 25° C. and the molecular weight by Gel Permeation Chromatography is found to be $\overline{Mn}=5301$, $\overline{Mw}/\overline{Mn}=2.9$.

Three hundred (300) parts of this polymer solution are mixed well with 11.2 parts of aluminum flakes (65% in naphtha), 3.2 parts of zinc naphthanate, and 97 parts of hexamethoxymethyl melamine (Cymel 301) are added to this mixture. 64 parts of hydroxyphosphate reaction product from (a) are dissolved in 50 ml of cellusolve acetate; this solution is added to the above mixture and the resulting formulation applied by spraying to primed steel panels in three coats. The panels are baked at 130° C. for 20 minutes to obtain silver metallic coatings with excellent physical properties.

In view of this disclosure, many modifications of this invention will be apparent to those skilled in the art. It is intended that all such modifications which fall within the true scope of this invention be included within the terms of the appended claims.

I claim:

1. A thermosetting coating composition adapted for low temperature bake applications which contains greater than about 60% by weight of nonvolatile solids, and which, exclusive of pigments, solvents and other nonreactive components, consists essentially of:

(A) a bifunctional copolymer bearing hydroxy functionality and pendant epoxy functionality, having a number average molecular weight ($\overline{Mn}$) of between about 1500 and about 10,000 and a glass transition temperature (Tg) of between about −25° C. and about 70° C., said copolymer consisting essentially of (i) between about 5 and about 25 weight percent of monoethylenically unsaturated monomers bearing glycidyl functionality and between about 5 and about 25 weight percent of monoethylenically unsaturated monomer bearing hydroxy functionality, with the total of said glycidyl and hydroxy functional monomers being not greater than about 30 weight percent of the monomers in said bifunctional copolymer and (ii) between about 90 and about 70 weight percent of other monoethylenically unsaturated monomers;

(B) a reactive catalyst comprising hydroxy functional organo-phosphate ester having the formula:

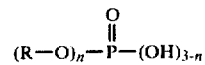

wherein n=1 to 2 and R is selected from the group consisting of mono or dihydroxy radicals containing one or more ester linkages and having a molecular weight of between about 120 and about 1500;

(C) an amine-aldehyde crosslinking agent; and (D) up to about 45 weight percent based on the total weight of (A), (B), (C), and (D) of a hydroxy functional additive having a number average molecular weight ($\overline{Mn}$) of between about 150 and about 6000, said organophosphate ester being included in said composition in an amount sufficient to provide between about 0.8 and about 1.5 equivalents of acid functionality for each equivalent of pendent epoxy functionality on said bifunctional copolymer, and said amine aldehyde crosslinking agent being included in said composition in an amount sufficient to provide at least about 0.4 equivalents of nitrogen crosslinking functionality for each equivalent of hydroxy functionality included in said composition either as (i) an organic hydroxyl group on said organophosphate ester, (ii) a hydroxyl group on said bifunctional copolymer, (iii) a hydroxyl group on said hydroxy functional additive, or (iv) as a result of esterification of said pendent epoxy functionality of said bifunctional copolymer during cure of said coating composition.

2. A composition in accordance with claim 1, wherein said monoethylenically unsaturated monomers bearing glycidyl functionality in said bifunctional copolymer are selected from glycidyl esters and glycidyl ethers.

3. A composition in accordance with claim 2, wherein said monoethylenically unsaturated monomers bearing glycidyl functionality are selected from glycidyl esters of monoethylenically unsaturated carboxylic acids.

4. A composition in accordance with claim 1 wherein said monoethylenically unsaturated monomers bearing hydroxy functionality in said bifunctional copolymer are selected from the group consisting of hydroxyalkyl acrylates formed by the reaction of $C_2$–$C_5$ dihydric alcohols and acrylic or methacrylic acids.

5. A composition in accordance with claim 1, wherein said other monoethylenically unsaturated monomers in said bifunctional copolymer are selected from the group consisting of acrylates and other monoethylenically unsaturated vinyl monomers.

6. A composition in accordance with claim 5 wherein said acrylate monomers comprise at least about 50 weight percent of the total monomers in said bifunctional copolymer and are selected from its group consisting of esters of $C_1$–$C_{12}$ monohydric alcohols and acrylic or methacrylic acids.

7. A composition in accordance with claim 1 wherein said oligomeric hydroxy functional organophosphate esters are esters wherein R is a mono- or dihydroxy alkyl, cycloalkyl or aryl radical.

8. A composition in accordance with claim 1 wherein said oligomeric hydroxy functional organophosphate ester is a monoester.

9. A composition in accordance with claim 1 wherein said oligomeric hydroxy functional organophosphate ester is a diester.

10. A composition in accordance with claim 1 wherein said oligomeric hydroxy functional organophosphate ester is a mixture of mono- and diesters.

11. A composition in accordance with claim 10 wherein said oligomeric hydroxy functional organophosphate esters are esters wherein R is a mono- or dihydroxy alkyl, cycloalkyl or aryl radical.

12. A composition in accordance with claim 1 wherein said oligomeric hydroxy functional organophosphate ester is the reaction product of a di- or trihydroxy oligoester and phosphorus pentoxide.

13. A composition in accordance with claim 12 wherein said reactive catalyst including said oligomeric hydroxy functional organophosphate ester is the reaction product of an excess of a di- or trihydroxy alkyl, cycloalkyl or aryl oligoester and phosphorus pentoxide.

14. A composition in accordance with claim 12 wherein said reactive catalyst including said oligomeric hydroxy functional organophosphate ester is the reaction product of an excess of a trihydroxy alkyl, cycloalkyl or aryl oligoester in which at least one of the hydroxyl groups is secondary, and phosphorus pentoxide.

15. A composition in accordance with claim 1 wherein said amine-aldehyde crosslinking agent selected from the group consisting of condensation products of formaldehyde with melamine, substituted melamine, urea, benzoguanamine and substituted benzoguanamine, and mixtures of said condensation products, and is included in an amount sufficient to provide between about 0.6 and about 2.1 equivalents of nitrogen crosslinking functionality per equivalent of hydroxy functionality.

16. A composition in accordance with claim 1, wherein said hydroxy functional additive is selected from the group consisting of (i) hydroxy functional polyesters, (ii) hydroxy functional polyethers, (iii) hydroxy functional oligoesters, (iv) monomeric polyols; (v) hydroxy functional copolymers formed from monoethylenically unsaturated monomers, one or more of which bears hydroxy functionality and which is included in said copolymer in amounts ranging from about 2.5 to about 30 weight percent of said copolymer, and (vi) mixtures of (i)–(v).

17. A composition in accordance with claim 1 wherein said organophosphate ester is included in said composition in an amount sufficient to provide between about 1 and about 1.2 equivalents of acid functionality for each equivalent of pendent epoxy functionality on said bifunctional copolymer.

* * * * *